UNITED STATES PATENT OFFICE.

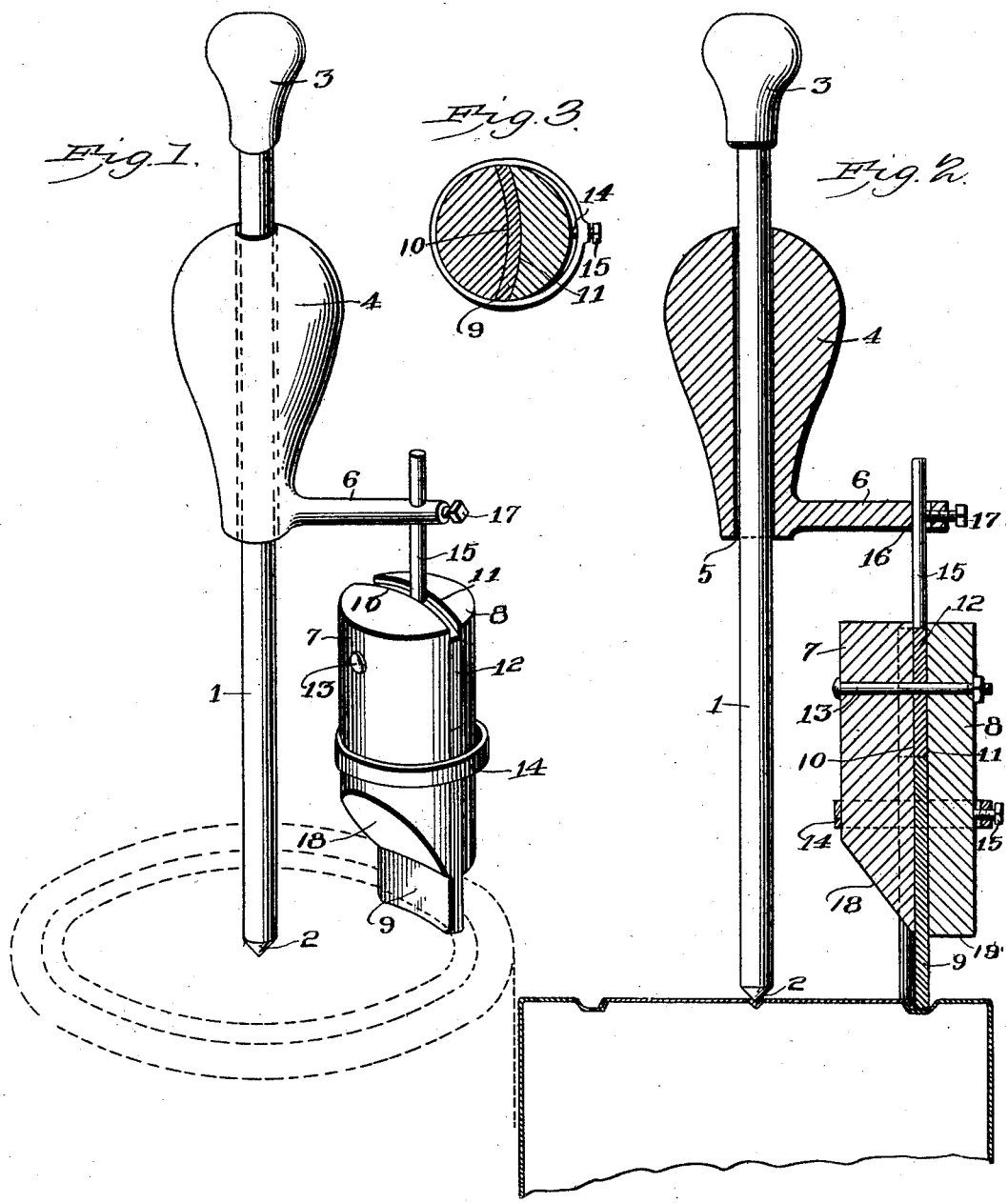

WALTER MORSE, OF SHARON, MARYLAND, ASSIGNOR OF ONE-HALF TO JAMES M. MORSE, OF SHARON, MARYLAND.

CAN-CAP-SOLDERING IRON.

SPECIFICATION forming part of Letters Patent No. 713,665, dated November 18, 1902.

Application filed January 11, 1902. Serial No. 89,347. (No model.)

*To all whom it may concern:*

Be it known that I, WALTER MORSE, a citizen of the United States, residing at Sharon, in the county of Harford and State of Maryland, have invented a new and useful Can-Cap-Soldering Iron, of which the following is a specification.

The invention relates to improvements in can-cap-soldering irons.

The object of the present invention is to improve the construction of can-cap-soldering irons and to provide a simple and comparatively inexpensive one adapted to be readily operated and capable, as the solder-engaging edge becomes worn, to be readily adjusted to take up the wear and to present a proper edge or portion for melting and spreading the solder without filing or otherwise operating on the material and wasting the same.

The invention consists in the construction and novel combination and arrangement of parts, hereinafter fully described, illustrated in the accompanying drawings, and pointed out in the claims hereto appended.

In the drawings, Figure 1 is a perspective view of a can-soldering iron or tool constructed in accordance with this invention. Fig. 2 is a vertical sectional view of the same. Fig. 3 is a detail sectional view illustrating the manner of adjustably clamping the soldering plate or bit between the heat-retaining blocks.

Like numerals of reference designate corresponding parts in all the figures of the drawings.

1 designates a vertical rod having a tapered lower end 2 and provided at its upper end with a grip or handle 3 and forming a spindle for a rotary grip or handle 4, which carries the soldering-iron head and which is adapted to swing the same around the top of a can to spread and melt the solder for securing the can-cap to the body of the can. The rotary grip or handle 4 is provided with a vertical opening 5 for the rod 1, and it is capable of vertical movement on the same to adjust the parts, and it is provided at its lower end with a horizontal arm 6, from which is suspended the soldering-iron head.

The soldering-iron head is composed of inner and outer heat-retaining blocks 7 and 8 and a soldering plate or bit 9, which is adjustably clamped between the lower portions of the heat-retaining blocks and which is of a thickness to present a proper edge to the solder and which when worn is simply adjusted downward and outward. The blocks 7 and 8, which are approximately semicylindrical, are provided, respectively, with convex and concave inner faces 10 and 11, arranged parallel and spaced apart by a plate 12. The plate 12 is secured between the upper portions of the heat-retaining blocks by a transverse bolt 13, and a lower curved space is provided between the lower portions of the heat-retaining blocks for the reception of the soldering plate or bit, which is curved to conform to the configuration of the cap to be soldered. The soldering plate or bit is adjustably secured between the lower portions of the heat-retaining blocks by means of a clamp, consisting of a ring or band 14 and a clamping-screw 15. The ring or band receives the lower portions of the heat-retaining blocks and is provided with a threaded aperture for the reception of the clamping-screw, which engages the outer block, as clearly shown in Fig. 2. By loosening the screw the soldering plate or bit may be readily adjusted, and when the screw is tightened the plate or bit is firmly held in its adjusted position. The upper portions of the heat-retaining blocks are perforated for the reception of the bolt 13, which also passes through the plate 12.

The spacing-plate 12, which is curved, is provided with a centrally-arranged vertically-disposed stem or rod 15, which passes through a perforation 16 of the arm 6 and which is secured at any desired adjustment by a clamping-screw 17, mounted in a threaded perforation of the end of the arm 6, as clearly shown in Fig. 2. By means of the connection between the arm 6 and the stem 15 the soldering-iron head may be readily adjusted vertically, and this adjustment will coöperate with the adjustment of the soldering plate or bit to extend the lower edge or end of the latter the desired distance below the rotary grip or handle.

The rod 1 is held with one hand by gripping the handle 3, and the other handle or grip is rotated with the other hand. In order to enable the operator to have the lower edge or end of the soldering plate or bit in full view, the inner block 7 is provided with a beveled lower portion 18, which is always toward the operator and which exposes the lower portion of the soldering plate or bit, as will be readily understood. The outer block 8 is of the same thickness throughout its entire length and has a horizontal lower face 19 arranged at right angles to the planes of its side faces in order to arrange as much metal as possible close to the lower portion of the bit or plate.

It will be seen that the soldering-tool is exceedingly simple and inexpensive in construction, that it is adapted to be easily operated, and that it is capable of ready adjustment to advance the soldering plate or bit as the same becomes worn.

What I claim is—

1. A tool of the class described comprising a rod or spindle, a rotary arm mounted thereon, a pair of heat-retaining blocks spaced apart and connected with and carried by the arm, an adjustable plate or bit arranged between the blocks and extending downward therefrom, and a clamp embracing the blocks and securing the plate or bit in its adjusted position, substantially as described.

2. A tool of the class described comprising a rod or spindle, a rotary grip having an arm, the heat-retaining blocks, the spacing-plate secured between the upper portions of the heat-retaining blocks and provided with a stem connected with the arm, the adjustable plate or bit arranged between the lower portions of the heat-retaining blocks, and a clamp embracing the blocks and securing the plate or bit between the same, substantially as described.

3. A tool of the class described comprising a spindle, a rotary grip mounted on the spindle and having an arm, heat-retaining blocks, a plate arranged between the upper portions of the heat-retaining blocks and provided with a stem adjustably secured to the arm, a fastening device passing through the upper portions of the blocks and through the plate, a soldering plate or bit adjustably arranged between the lower portions of the blocks, and a band receiving the lower portions of the blocks and provided with a clamping-screw, substantially as and for the purpose described.

In testimony that I claim the foregoing as my own I have hereto affixed my signature in the presence of two witnesses.

WALTER MORSE.

Witnesses:
GILBERT S. HAWKINS,
CLIFFORD D. ROSAN.